(12) United States Patent
Rahman

(10) Patent No.: US 6,592,262 B2
(45) Date of Patent: Jul. 15, 2003

(54) BEARING PERFORMANCE ENHANCEMENT UTILIZING SLEEVE/HUB RADIAL SURFACES

(75) Inventor: Mohamed Mizanur Rahman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 26 days.

(21) Appl. No.: 10/017,244

(22) Filed: Dec. 13, 2001

(65) Prior Publication Data

US 2002/0191873 A1 Dec. 19, 2002

Related U.S. Application Data

(60) Provisional application No. 60/298,682, filed on Jun. 15, 2001.

(51) Int. Cl.[7] .............................................. F16C 17/10
(52) U.S. Cl. ...................................... 384/107; 384/112
(58) Field of Search ................................. 384/107, 112, 384/113, 114, 123

(56) References Cited

U.S. PATENT DOCUMENTS 6,371,650 B1 * 4/2002 Goto et al. ................. 384/110
6,404,087 B1 * 6/2002 Ichiyama .................... 384/119
2002/0037226 A1 * 3/2002 Vogel ........................ 384/115

* cited by examiner

Primary Examiner—Lenard A. Footland
(74) Attorney, Agent, or Firm—Moser, Patterson and Sheridan, LLP

(57) ABSTRACT

A motor is disclosed comprising a rotating shaft where the shaft comprises both an axial shaft and at least one thrust plate, both the shaft and thrust plate being supported for rotation by fluid dynamic bearings. A secondary fluid dynamic bearing is provided, coupled to the main support fluid dynamic bearing, and is oriented to provide additional axial and/or radial stiffness. Preferably, the secondary fluid dynamic bearing is defined between the sleeve which establishes the bore wherein the shaft rotates, the sleeve having an outer surface which is cylindrical and defines and includes one surface of the secondary fluid dynamic bearing, the other surface being defined by the inner surface of a hub which is coupled mechanically to the rotating shaft and thrust plate and is rotating over and around the sleeve.

The thrust plate bearing and a part of the journal bearing comprise fluid; the remainder of the journal bearing and the supplementary or secondary bearing could comprise either a lighter viscosity fluid or even air.

20 Claims, 3 Drawing Sheets

BEARING PERFORMANCE ENHANCEMENT UTILIZING SLEEVE/HUB RADIAL SURFACES

CROSS-REFERENCE TO RELATED APPLICATIONS

This application is based on a provisional application No. 60/298,682, filed Jun. 15, 2001, entitled "Bearing Performance Enhancement Utilizing Sleeve/Hub Radial Surfaces," invented by Mohamed M. Rahman.

BACKGROUND OF THE INVENTION

FIELD OF THE INVENTION

This invention is related generally to the field of hydrodynamic bearings, and especially to the field of rotating shaft motors utilizing fluid dynamic bearings.

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle, the information being accessed by means of transducers located on a pivoting arm, which moves radially over the surface of the disk. The read/write heads or transducers must be accurately aligned with the storage tracks on the disk to ensure proper reading and writing of information; thus the disks must be rotationally stable.

During operation, the disks are rotated at very high speeds within an enclosed housing by means of an electric motor, which is generally located inside the hub or below the disks. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disk drive spindles run under conditions that generally guarantee physical contact between raceway and ball, in spite of the lubrication layer provided by the bearing oil or grease. Hence, bearing balls running on the generally smooth but microscopically uneven and rough raceways transmit this surface structure as well as their imperfection in sphericity in the form of vibration to the rotating disk. This vibration results in misalignment between the data tracks and the read/write transducer. This source of vibration limits the data track density and the overall performance of the disk drive system.

Another problem is related to the application of hard disk drives in portable computer equipment, resulting in severely increased requirements for shock resistance. Shocks create relative acceleration between the disks and the drive casing, which in turn show up as a force across the bearing system. Since the contact surfaces in ball bearings are very small, the resulting contact pressures may exceed the yield strength of the bearing material, and leave long-term deformation and damage to the raceway and the balls of the ball bearing.

Moreover, mechanical bearings are not easily scaleable to smaller dimensions. This is a significant drawback since the tendency in the disk drive industry has been to continually shrink the physical dimensions of the disk drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing and the rotating spindle or rotating hub of the motor. For example, liquid lubricants comprising oil, more complex ferro-magnetic fluids or even air have been utilized in hydrodynamic bearing systems. The reason for the desirability of the use of air is the importance of avoiding the outgassing of contaminants into the sealed area of the head/disk housing. However, air does not provide the lubricating qualities of oil. The relatively higher viscosity of oil allows for larger bearing gaps and therefore looser tolerance standards to achieve similar dynamic performance.

A common type of fluid dynamic bearing comprises a shaft extending through the sleeve or hub with one or more radially extending plates supported from the shaft. A hydrodynamic bearing is provided between the shaft and the bore through the hub, with the fluid, which occupies the gap between the inner surface of the bore and the outer surface of the shaft providing the stiffness for the shaft. Without this stiffness, the shaft is prone to tilting or wobbling over the life of the motor. As a result, any hub or disk supported for rotation by the shaft is prone to wobbling or tilting. Any such tilting or instability in the hub or disk would make reading or writing of data on the disk surface very difficult, and diminish the life of the motor and the disk drive in which it is used.

However, the very fact that a fluid dynamic bearing design relies on the use of fluid in a very narrow gap between a shaft and surrounding bore for establishing and maintaining radial stiffness and fluid in a gap between a thrust plate and the surrounding bore to maintain axial stiffness creates a problem. A fluid of an extremely high viscosity, or even air will not provide the desired stiffness, damping, and loading capacity. Therefore, the obvious direction would be to go to thicker, heavier, higher viscosity lubricants to fill the gap and stabilize the system. However, power loss in a high speed liquid lubricant bearing is also a major concern. The use of a thicker lubricant would create a drag; therefore, the problem remains of achieving a balance between providing the requisite loading damping and stiffness, while minimizing power consumption required to cause rotation in the system.

SUMMARY OF THE INVENTION

The present invention relates to a fluid dynamic bearing in which in addition to the journal and/or thrust bearing which is provided to support the shaft for rotation, a supplementary fluid dynamic bearing is provided to enhance the axial and radial stiffness, damping and loading capacity of the design.

According to the present invention, in one embodiment, a motor is disclosed comprising a rotating shaft where the shaft comprises both an axial shaft and at least one thrust plate, both the shaft and thrust plate being supported for rotation by fluid dynamic bearings. A secondary fluid dynamic bearing is provided, coupled to the main support fluid dynamic bearing, and is oriented to provide additional axial and/or radial stiffness. Preferably, the secondary fluid dynamic bearing is defined between the sleeve which establishes the bore wherein the shaft rotates, the sleeve having an outer surface which is cylindrical and defines and includes one surface of the secondary fluid dynamic bearing, the other surface being defined by the inner surface of a hub which is coupled mechanically to the rotating shaft and thrust plate and is rotating over and around the sleeve.

The thrust plate bearing and a part of the journal bearing could preferably comprise fluid; the remainder of the journal bearing and the supplementary or secondary bearing could comprise either a lighter viscosity fluid or even air.

In a form of the invention, the gap of the liquid thrust bearing can be reduced to the smallest possible size to reduce power loss. In a further embodiment, the journal bearing which comprises a liquid bearing could also be substantially diminished in size.

In another approach to the invention, a portion of the journal bearing would comprise a lower viscosity fluid than the remainder of the journal bearing and the thrust bearing, and/or even air.

In another embodiment of the invention, the secondary support bearing would be defined in a gap which is wider than the gap in either the primary journal bearing and/or the thrust bearing.

In another feature of the invention, the fluid in the secondary bearing would only be air or a very light viscosity fluid.

In a further feature of the invention, the grooves in the secondary bearing gap would be spiral, and orient to pump the light viscosity fluid or air only towards the journal bearing, further stabilizing both axially and radially the support bearing for the shaft and thrust plate.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention, and are therefore not to be considered limiting of its scope, for the invention may admit to other equally effective embodiments.

DETAILED DESCRIPTION OF THE PREFERRED EMBODIMENT

A fluid dynamic spindle motor is especially useful on a disc drive is disclosed herein. A primary purpose of the present invention is to modify the design of the spindle motor of the hydrodynamic bearing supported shaft so that minimum power is required to support the shaft at a constant speed of rotation. It is also highly desirable that the required stiffness, damping and loading capacity of the fluid dynamic based system be maintained.

Figure 1:
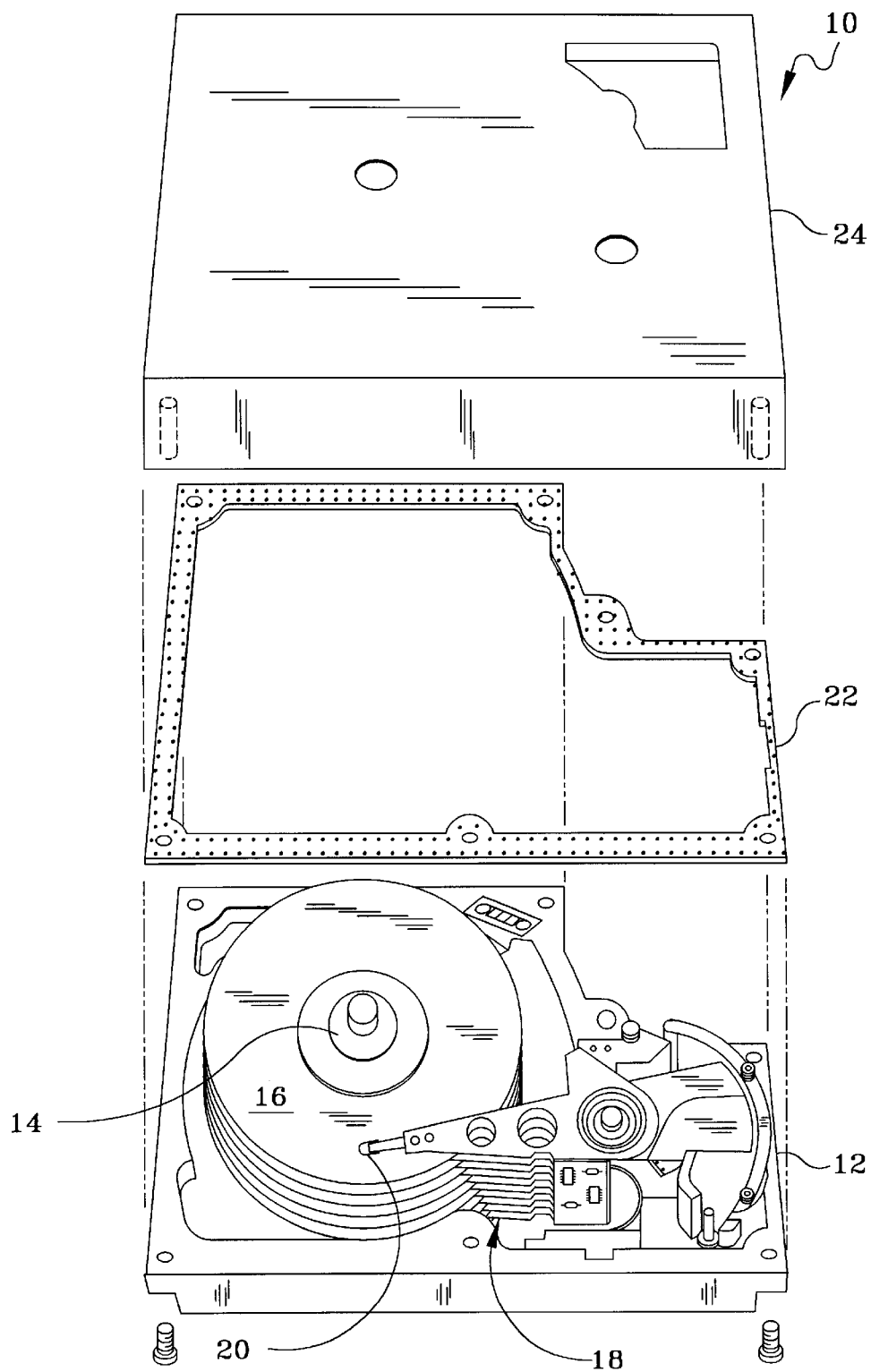
FIG. 1 is a perspective exploded view of a disc drive in which the present invention is useful.

The motor of the present invention, although not limited to use in disk drives, is especially useful therein. Therefore, FIG. 1 shows an exploded perspective view of a disk drive storage system in which the present bearing and/or motor would be useful. FIG. 1 is provided primarily to give an illustrative example of the environment in which this motor is used; clearly, the invention herein could be used equally well in other designs of disk drives, or other operating environments apart from disk drive technology where stiffness of the shaft against radial instability is important.

In the particular example of FIG. 1, the storage system 10 includes a housing 12 having a spindle motor 14, which rotatably carries the storage disks 16 which are to be discussed in detail below. An armature assembly 18 moves transducers 20 across the surface of the disks 16. The environment of disks 16 is sealed by seal 22 and cover 24. In operation, disks 16 rotate at high speed while transducers 20 are positioned at any one of a set of radially differentiated tracks on the surface of the disks 16. This allows the transducers to read and write encoded information on the surface of the disks at selected locations. The disks rotate at very high speed, several thousand rpm, in order to maintain each transducer flying over the surface of the associated disk. In present day technology, the spacing distance between the transducer and the rotating disk surface is measured in micro-inches; thus, it is essential that the disk does not vibrate or tilt away from the plane in which it is designed to rotate. As such, tilting, displacement or vibration could easily disturb the air flow, which is maintaining the flight of the transducer over the surface, or simply cause mechanical contact between the transducer and the disk surface. Such contact would probably damage the disk surface, resulting in the loss of disk storage space. It could even damage the transducer, resulting in loss of use of the disk drive.

Figure 2:
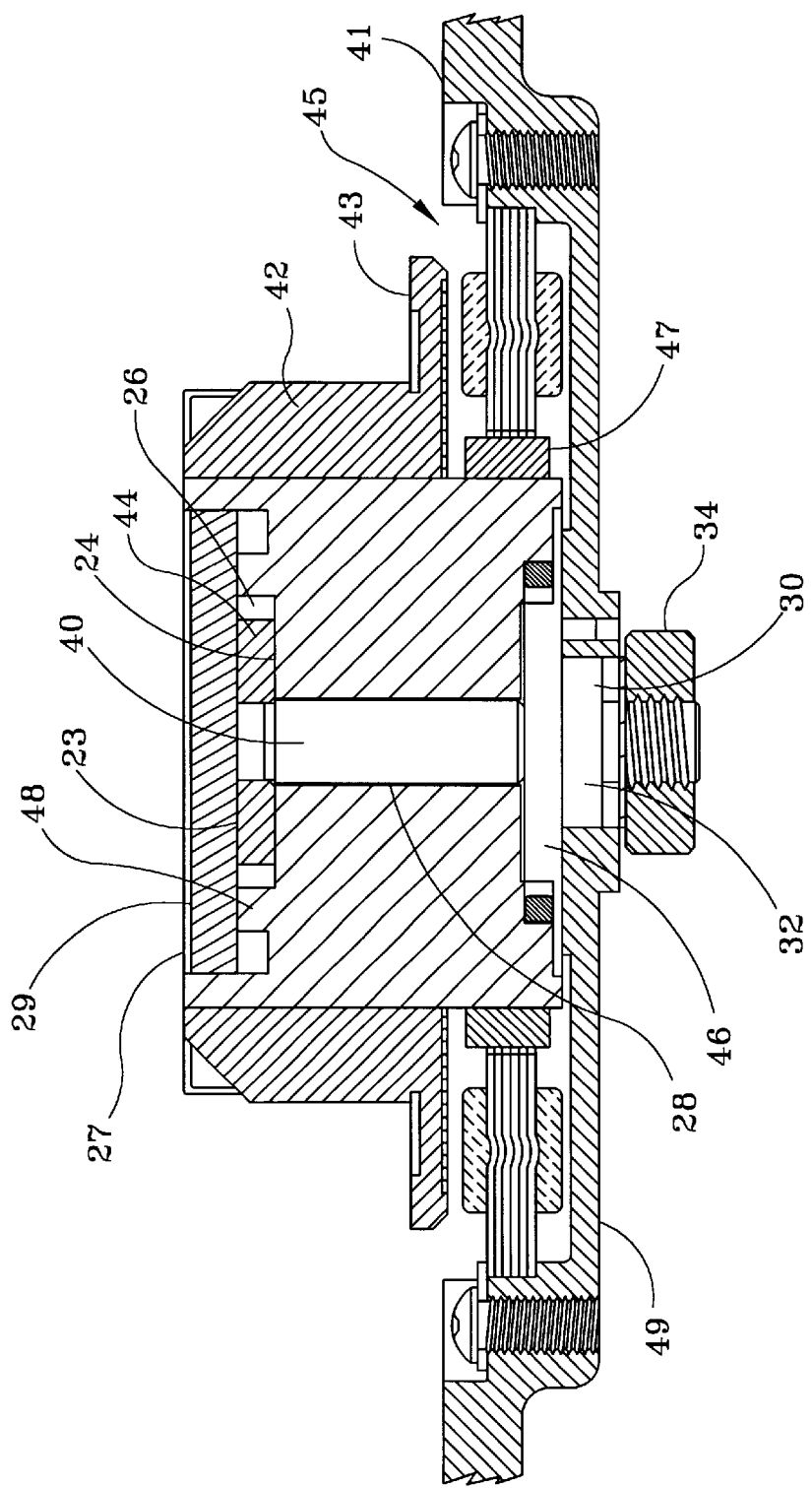
FIG. 2 is a vertical perspective view of a spindle motor incorporated in a disc drive, the spindle motor being of the type which could be modified to incorporate the present invention.

Referring next to FIG. 2, this figure is a vertical section through a spindle motor of a type useful in the disk drive of FIG. 1. The basic structure of the motor of FIG. 2, at least as much as is relevant to this invention, includes a stationary shaft 40 and a hub 42 that rotates around the shaft. The hub supports one or more disks on the shoulder 43 for rotation in response to energization of the motor, which lies below the hub and comprises, in part, stator 45 and magnet 47. Energization of the stator coils, as is well known in this technology, will cause rotation of the hub about the shaft.

The shaft 40 includes a thrust plate 44 at one end and terminates in a shoulder 46 at the opposite end, which is supported from the base 49. The hub 42 includes a bushing 48 which houses a counter plate 29 at one end, opposite the thrust plate 44.

In this motor design, fluid is maintained in the gap 28 between the outer surface of the shaft and the inner surface of the bushing or sleeve 48 in order to maintain the stability of the bushing and hub 42 rotating about the shaft. Fluid is also maintained in the gap 24 between gaps 23 and 24 between the surfaces of the thrust plate 44, the counter plate 29, and the facing surface of the bushing 48 to allow for rotation of the bushing relative to the thrust plate 44 while maintaining the radial stability of the bushing 48 and hub 42.

It should be especially noted that the design with which this invention is especially useful is a rotating shaft design, although it's adaptability to use with a fixed-design is certainly within the scope of the present invention.

Figure 3:
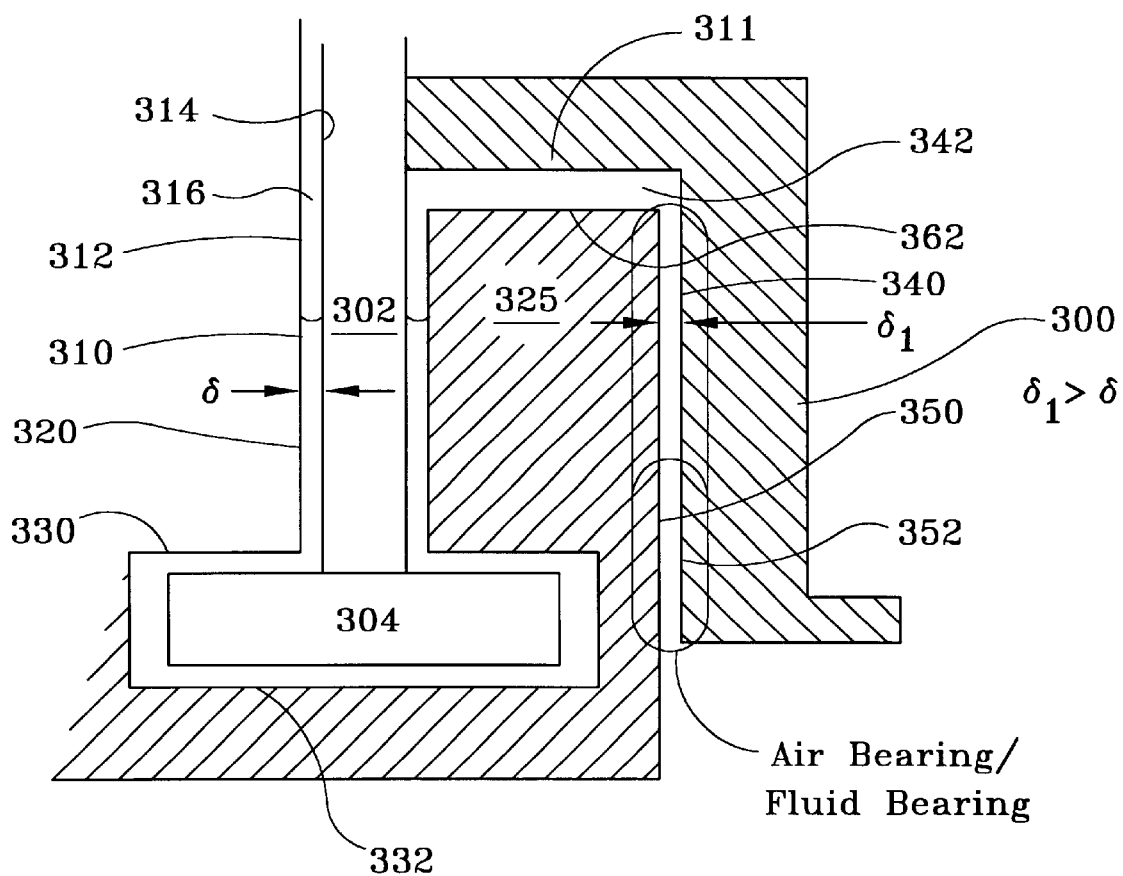
FIG. 3 is a vertical partial sectional view of a modified spindle motor incorporating the present invention.

Thus referring to FIG. 3, it can be seen that in contrast to FIG. 2, the hub 300 is attached to at or near an end of the shaft 302 which also supports at least one thrust plate 304 at a distal end thereof. In this invention, the placement and the number of thrust plates along the shaft is not considered to be a limiting feature of the invention. The shaft includes a journal bearing 310 which comprises grooves on one of the 2 facing surfaces 312, 314 which face each other across the gap 316 which is filled with fluid to support relative rotation between the shaft and the surrounding sleeve 325. This journal bearing 310, supports the shaft 302 for rotation, and provides radial stiffness against tilting, side-to-side, of the shaft. The thrust plate 304 includes similar, known thrust bearings generally indicated at 330, 332 on the upper and lower surfaces of the thrust plate, each thrust bearing comprising grooves on one of the facing surfaces and fluid for supporting the thrust plate for rotation. Again, the fluid provides axial stiffness, against tilting of the thrust plate and therefore the hub and the disc or discs which it supports relative to the sleeve 325.

It is readily apparent from this discussion that the fluid preferably has some viscosity or thickness to provide stiffness against this tilting; but is equally apparent that the thicker or more viscous the fluid, that the greater the loss of power to create constant speed rotation of the shaft 302 and thrust plate 304. Therefore, according to the present approach, a secondary or supplementary fluid dynamic bearing 340 is defined. This secondary bearing is connected by a channel 342 to the primary fluid dynamic bearing defined along shaft 302 and thrust plate 304, and comprises a pair of surfaces relatively rotating past one another which in this case are an outer surface 350 of sleeve 25 and an inner surface 352 of hub 300.

In order to enhance the stiffness of the design, a fluid dynamic bearing 340 formed in this gap between surfaces 350 and 352 comprises a set of grooves on one of the two surfaces, these grooves preferably being spiral in design, and also in the preferred form being aligned to pump the fluid only towards the journal bearing 310.

It should further be noted that the radial dimension or width of the gap in the fluid dynamic bearing 340 is less critical than the width of the gap 316 at the journal bearing, and so therefore of the secondary journal bearing 340 is typically wider than the width of the primary journal bearing 314. It should also be noted that the width of the gap in the upper and lower thrust bearing 330, 332 can be reduced to the smallest possible size consistent with maintaining gap separation because of the added stability provided by the secondary bearing 340.

It is another benefit that the radial groove 342 which is coupled to the primary journal bearing 314 could also incorporate grooves on one of the two facing surfaces 360, 362, thereby defining a further secondary bearing to enhance the axial stability of the overall system. If such an additional bearing 342 were defined, it would typically, like the bearing 340, use air as the fluid. The grooves would preferably either be balanced or aligned to have differential pumping toward the journal bearing.

The journal bearing itself would be in part a fluid dynamic bearing, using a liquid of appropriate viscosity in the region 370 of the bearing. The remaining region of the journal bearing 310 would be a fluid bearing, preferably using air as the bearing. The objective of the design would be to reduce the journal portion of the bearing which utilitizes liquid to a minimum length consistent with radial stability, while minimizing power consumption.

Other features, advantages and alternatives of the invention may occur to a person of skill in this field. For example, rather than having the secondary bearing being parallel to the journal bearing, as described in the preferred form 340 above, and/or having a secondary bearing 342 parallel to the thrust bearings for added axial stability, a conical secondary bearing could be added, defined between the outer surface of sleeve 325 and an inner surface of hub 300, and extending angularly away from its connection point to the primary journal bearing 314. In this form, a secondary conical bearing would supplement both the axial and radially stability of the system. Other features and advantages of the invention would be apparent to a person of skill in the art who studies this invention disclosure. Therefore, the scope of this invention is to be limited only by the following claims.

What is claimed is:

1. A spindle motor comprising a rotating shaft having at least one thrust plate supported thereon, a sleeve supported from a base for the motor, the sleeve comprising an interior surface defining a gap adjacent each radial surface of the thrust plate to define a thrust bearing therewith, and the sleeve further defining a cylindrical interior surface establishing a gap radially spaced from the exterior surface of the shaft to define a journal bearing, the thrust bearing and the journal bearing having fluid therein to support the shaft and the thrust plate against axial and radial tilting, and the sleeve further having an exterior cylindrical surface cooperating with an interior cylindrical surface of a hub mounted for rotation on an end of the shaft distant from the thrust plate, the interior surface of the hub and the exterior surface of the sleeve cooperating to define a secondary fluid dynamic bearing which aids in supporting the shaft against axial and radial displacement.

2. A motor as claimed in claim 1, further comprising a radial by oriented gap extending from the gap defining the secondary bearing to the gap defining the journal bearing, the radial gap being provided to establish fluid communication between the secondary fluid bearing and the primary fluid bearing and being defined between the sleeve and the hub.

3. A motor as claimed in claim 2 wherein the radial gap of the secondary bearing is greater in radial dimension than the radial gap of the journal bearing.

4. A motor as claimed in claim 3 wherein the thrust bearing and at least a part of the journal bearing gap are filled with liquid, and a remainder of the journal bearing gap and the secondary fluid dynamic bearing are filled with air.

5. A motor as claimed in claim 4 wherein the secondary bearing is defined by a set of grooves calculated to pump air toward the journal bearing.

6. A motor as claimed in claim 5 wherein the secondary bearing is parallel to the journal bearing.

7. A motor as claimed in claim 5 wherein the axial gap defining the thrust bearing is smaller than the radial gap defining the journal bearing.

8. A motor as claimed in claim 7 wherein the axial gap defining the secondary bearing is greater than the axial gap defining the journal bearing, and where the secondary bearing and the journal bearing are parallel.

9. A motor as claimed in claim 8 wherein the radial by oriented gap connecting the secondary bearing to the journal bearing is wider in the dimension measured between relatively rotating surfaces than either of the journal bearing or the secondary bearing.

10. A motor as claimed in claim 9 wherein the grooves defining the secondary fluid dynamic bearing are spiral and pump air only towards the journal bearing.

11. A fluid dynamic bearing system comprising a rotating shaft, having at least one thrust plate supported thereon, a sleeve comprising an interior surface defining a gap adjacent each radial surface of the thrust plate to define a thrust bearing therewith, and the sleeve further defining a cylindrical interior surface establishing a gap radially spaced from the exterior surface of the shaft to define a journal bearing, the thrust bearing and the journal bearing having fluid therein to support the shaft and the thrust plate against axial and radial tilting, and the sleeve further having an exterior cylindrical surface cooperating with an interior surface of a hub mounted for rotation on an end of the shaft distant from the thrust plate, the interior surface of the shaft and exterior surface of the sleeve cooperating to define a secondary fluid dynamic bearing which aids in supporting the shaft against axial and radial displacement.

12. A bearing as claimed in claim 11, further comprising a radial by oriented gap extending from the gap defining the secondary bearing to the gap defining the journal bearing, the radial gap being provided to establish fluid communication between the secondary fluid bearing and the primary fluid journal bearing.

13. A bearing as claimed in claim 12 wherein the radial gap of the secondary bearing is greater in radial dimension than the radial gap of the journal bearing.

14. A bearing as claimed in claim 12 wherein the secondary bearing is parallel to the journal bearing.

15. A motor as claimed in claim 14 wherein the thrust bearing and at least a part of the journal bearing gap are filled with liquid, and any remainder of the journal bearing gap and the secondary fluid dynamic bearing are filled with air.

16. A motor as claimed in claim 15 wherein the secondary bearing is defined by a set of grooves calculated to pump air toward the journal bearing.

17. A motor as claimed in claim 15 wherein the axial gap defining the thrust bearing is smaller than the radial gap defining the journal bearing.

18. A motor as claimed in claim 17 wherein the axial gap defining the secondary bearing is greater than the axial gap defining the journal bearing.

19. A fluid dynamic bearing system comprising a rotating shaft having at least one thrust plate supported thereon, a sleeve comprising an interior surface defining a gap adjacent each radial surface of the thrust plate to establish a thrust bearing therewith, and the sleeve further comprising an interior surface defining a gap radially spaced from the exterior surface of the shaft to establish a journal bearing, the thrust bearing and journal bearings having fluid therein to support the shaft and thrust plate against axial and radial tilting, and the sleeve and hub further comprising means for defining a secondary fluid dynamic bearing for supporting the shaft and thrust plate against axial and radial tilting.

20. A fluid dynamic bearing system as claimed in claim 19 wherein the secondary fluid dynamic bearing defining means are parallel to the journal bearing.

* * * * *